6406X
E. Kimber,
Inclined Railroad
Patented Mar. 5, 1831.
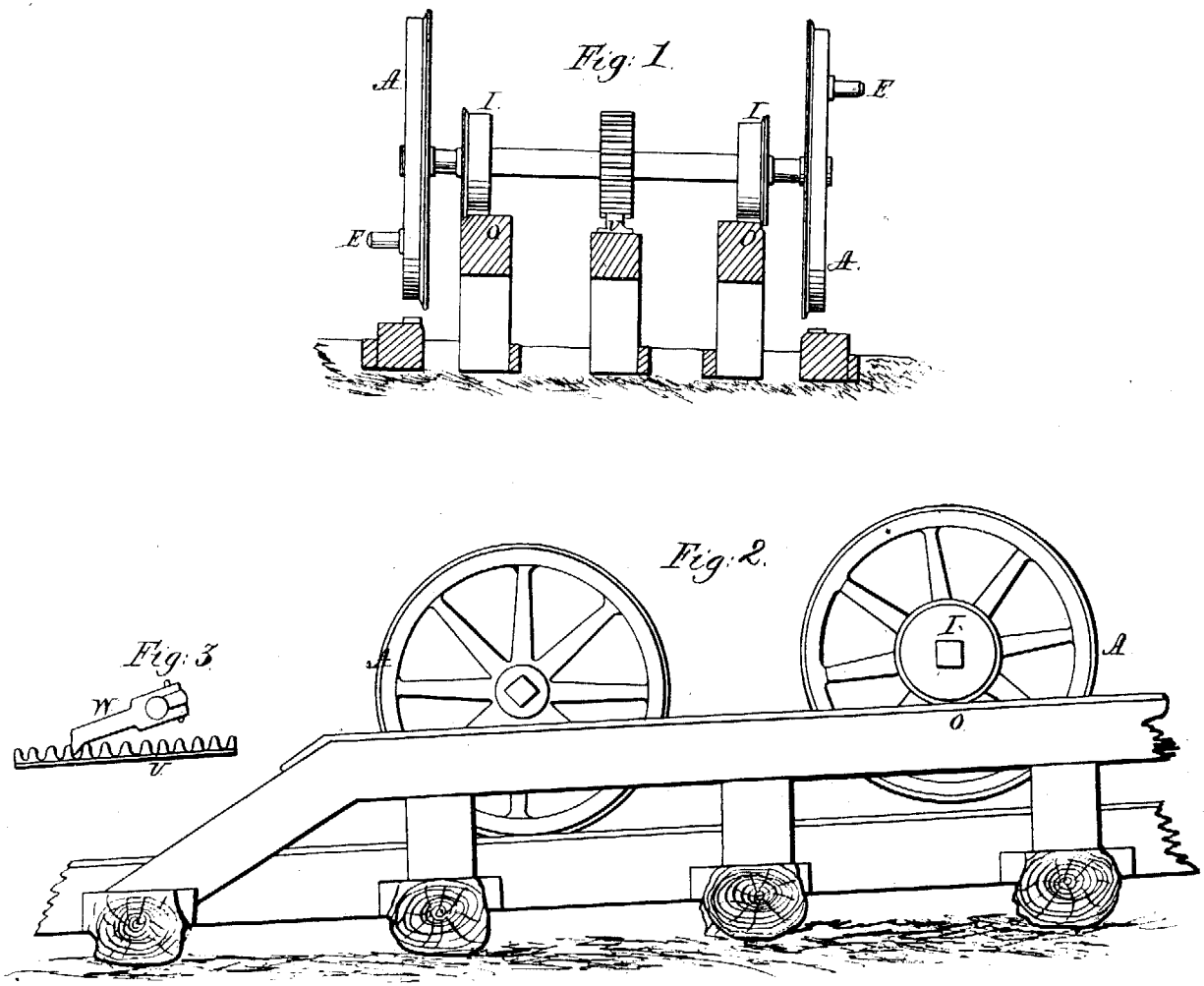
N. PETERS, PHOTO-LITHOGRAPHER, WASHINGTON, D. C.

Emmor Kimber
Letters Patent

The schedule referred to in these Letters Patent and making part
of the same containing a description in the words of the said Emmor
Kimber himself of his improvement in Locomotive Carriages
& rails adapted thereto

---

To all to whom these presents may come. Be it known that I
Emmor Kimber of Kimberton in the County of Chester & State
of Pennsylvania have invented a new & useful improvement in
Locomotive Carriages and that the following is a full & exact de-
scription of the construction & operation of the said improvement and
the formation of the Rail way on acclivities adapted thereto
The invention consists principally in employing the power of loco-
motive engines on acclivities in such manner that by diminishing
the velocity of its carriage the effective force of the engine will be increas-
ed in the same ratio - thereby superseding the necessity of stationary
engines. 1st a, a, are the common wheels of a locomotive carriage
(3 feet in diameter) to which the power of the engine is applied by a
wrist or crank at c, c,. On these wheels the locomotive carriage
runs upon a plane drawing the train forward on the rails nearly nine
feet for every revolution 2nd i, i, are two smaller wheels (attached
to a, a, or separate 1 foot in diameter) and placed upon the same axle
with a, a, To ascend acclivities the locomotive carriage runs upon
i, i, upon their own rails o, o, raising the common wheels clear from
their rails and therefore the carriage with the train moves forward
only three feet for every revolution. 3rd The diameter of the wheels
being as three to one the engine employs three times as much power
in a given space on the smaller wheels as on the common ones, but
the carriage and train move forward on the rails proportionally slow-
er. and so of wheels of any other proportions as four to one, five to one, &c.
4th On the middle of the fore axle is placed a cog wheel 8, of like di-
ameter another with the smaller wheels to work free in the cog rail w. to pre-
vent slipping on great ascents. This use of the cog wheel is known
and has been variously proposed & tried. The improvement consists
in substituting one cog wheel and its rail in the centre in the
stead of single rails and cog wheels on both sides of locomotive
carriages. 5th w, is a drag or pawle that may be attached to lo-
comotive carriages and every car in their train to work upon the
cog rail w, Its use is well known to prevent a slip or slide in
case of accidents on great acclivities – but it derives new im-
portance from its connexion with the cog rail w. elevated in the
middle of the road. 6th The ascending rails o, o, and w. may be
so constructed as to rest upon the foundations with the common
rails and be raised to their proper height by blocks, they are only
used in ascending acclivities and for the small wheels. The hind
wheels of the locomotive carriage and the wheels of all the cars in
the train run on the common rails. 7th In this specification the
wheels on the fore axle only are mentioned because the power is con-
sidered as applied to the fore wheels. If the power should be ap-
plied to the hind wheels instead or in part to both fore & hind
the principle would not thereby be changed. The small addi-
tional wheels on either or on both would be the application of
power described & claimed as my invention.

Kimberton, 2 mo: 24th 1831.

Witnesses — Emmor Kimber

[illegible] Benjn McVeagh

[illegible] Saml Shearer

[illegible]